United States Patent
Chen et al.

(10) Patent No.: US 8,943,521 B2
(45) Date of Patent: Jan. 27, 2015

(54) CD PLAYER WITH VIBRATION SUPPRESSION

(71) Applicant: Valley Wood Electrical (Shenzhen) Co., Ltd., Shenzhen, Guangdong (CN)

(72) Inventors: Yung Ta Chen, Guangdong (CN); Akeshi Shitamichi, Guangdong (CN); Rei Shukuya, Guangdong (CN); Minsheng Lu, Guangdong (CN)

(73) Assignee: Valley Wood Electrical (Shenzhen) Co., Ltd., Shenzhen, Guangdong (CN)

(*) Notice: Subject to any disclaimer, the term of this patent is extended or adjusted under 35 U.S.C. 154(b) by 0 days.

(21) Appl. No.: 14/094,157

(22) Filed: Dec. 2, 2013

(65) Prior Publication Data
US 2014/0181847 A1    Jun. 26, 2014

(30) Foreign Application Priority Data
Dec. 20, 2012    (CN) .......................... 2012 1 0557903

(51) Int. Cl.
| G11B 33/14 | (2006.01) |
| G11B 17/028 | (2006.01) |
| G11B 17/04 | (2006.01) |
| G11B 17/051 | (2006.01) |

(52) U.S. Cl.
CPC ........ *G11B 17/0284* (2013.01); *G11B 17/0404* (2013.01); *G11B 17/0515* (2013.01)
USPC .......................................................... 720/651

(58) Field of Classification Search
CPC ....................................................... G11B 33/08
USPC .......................................................... 720/651
See application file for complete search history.

(56) References Cited

U.S. PATENT DOCUMENTS

2003/0026192 A1*    2/2003   Takizawa et al. ............. 369/263

* cited by examiner

*Primary Examiner* — Joseph Feild
*Assistant Examiner* — Gustavo Polo
(74) *Attorney, Agent, or Firm* — Jackson IPG PLLC

(57) ABSTRACT

A compact disc (CD) player, which comprises playback substrates, a conveying roller, CD sensors, a CD stopper, a first trigger member, frame members, cam members and moving members, wherein the CD stopper has a major axis and abutting portions disposed at both ends of the axis; the first trigger member rotates when a minor-diameter CD stops at a mounting position on a turntable; the frame members receive the movement of the first trigger member; the cam members are coupled to the frame members; the moving members receive the rotation of the CD sensor and move along the outside diameter of a CD; the moving members are provided with clamping portions and abutted portions configured to be clamped with the abutting portions; and the cam members are provided with clamped portions configured to abut against the clamping portions.

2 Claims, 8 Drawing Sheets

CD PLAYER WITH VIBRATION SUPPRESSION

FIELD OF THE INVENTION

The invention relates to a compact disc (CD) player, in particular to a CD player provided with a stopper which is configured to stop a CD when the CD is conveyed by a conveying roller to a mountable position on a turntable.

BACKGROUND OF THE INVENTION

The CD player provided with the stopper which is configured to stop the CD when the CD is conveyed by the conveying roller to the mountable position on the turntable is well-known. Playback substrates are freely movably supported in a frame of the CD player, so that the vibration resistance can be improved. A CD player disclosed in the Japanese unexamined patent application publication No. 2005-302217 (hereinafter referred to as patent document 1) comprises the following components: a conveying roller configured to convey a CD from a CD insert to a channel on a playback substrate, a test rod configured to determine the outside diameter of the CD, and a stopper 8a configured to stop a minor-diameter CD conveyed by the conveying roller at a mountable position of a turntable. However, when a major-diameter (12 cm) CD is conveyed by the conveying roller, a front end of the stopper illustrated in the patent document 1 will rotate towards the insert, and the major-diameter CD will be away from the stopper. When a minor-diameter (8 cm) CD is conveyed by the conveying roller, the stopper holds still.

As described above, if the stopper 8a does not move when the minor-diameter CD is in the playback state on the playback substrate, when the playback substrate moves in a frame, the periphery of the minor-diameter CD will make contact with the stopper, and hence the playback of the minor-diameter CD will be hindered. Therefore, a stopper release mechanism configured to enable the stopper to be away from the CD is to be arranged. In this way, even if the playback substrate moves in the frame, the abutting connection between the stopper and the CD can be avoided.

In a CD playback player disclosed in the Japanese unexamined patent application publication No. 2008-226335 (hereinafter referred to as patent document 2), a playback substrate 15 is freely movably supported on a lower substrate 11 via a retainer plate 12. In addition, an upper substrate is provided with two test rods 45 and 46 configured to determine the outside diameter of a CD, two stopping members 97 and 98 driven to rotate by the CD, two moving members 142 and 143 configured to enable the stopper to be away from the CD, two synchronizing gears 144 and 145, and a cam plate 181 configured to drive one moving member 143 to move when the CD is kept in the playback state on the playback substrate 15. Moreover, when the CD is kept in the playback state on the playback substrate, the two moving members are driven to move towards mutually separating directions by the movement of the cam plate, and enable the stopping members to be away from the periphery of a major-diameter CD and a minor-diameter CD.

The stopper release mechanism of the CD player disclosed in the patent document 2 has a complex structure and includes: the two moving members 142 and 143 configured to enable the two stopping members 97 and 98 to be away from the CD in order to enable the stopping members to be away from the major-diameter CD and the minor-diameter CD, the two synchronizing gears 144 and 145 configured to enable the moving members to move synchronously, and the cam plate 181 configured to drive one moving member 143 to move when the CD is kept in the playback state on the playback substrate 15. Moreover, as the two stopping members 97 and 98 are driven to rotate by the major-diameter CD, the conveying roller is required to have a conveying force capable of overcoming the resistance.

SUMMARY OF THE INVENTION

The objective of the invention is to provide a CD player. The CD player adopts a simple structure so that the abutting connection between a minor-diameter CD and a CD stopper can be avoided when a playback substrate moves in a frame due to external vibration.

The CD player provided by the first invention comprises playback substrates, a conveying roller, CD sensors, a CD stopper, a first trigger member, frame members, cam members and moving members, wherein the playback substrates are freely movably supported in a frame; the conveying roller is configured to convey a CD from an insert of the frame to the playback substrate; the CD sensors are driven to rotate by the CD inserted into the insert; the CD stopper is provided with a major axis and abutting portions which are disposed at both ends of the axis and configured to abut against a minor-diameter CD conveyed by the conveying roller, is perpendicular to a centerline of a CD conveying path, and can rotate around the axis; the first trigger member rotates when the minor-diameter CD stops at a mountable position on a turntable via the CD stopper; the frame members are driven to move after receiving the movement of the first trigger member and the power of a motor; the cam members are coupled with the frame members to enable a chuck to be far away from the turntable; and the moving members receive the rotation of the CD sensor and move along the outside diameter of the CD. Moreover, the moving members are provided with clamping portions and abutted portions configured to be clamped with the abutting portions; clamped portions configured to abut against the clamping portions are disposed on the cam members or an actuating member coupled with the cam members at mobile terminals of the cam members; and the moving members enable the abutting portions to stop at positions, at which the abutting portions abut against the minor-diameter CD, via the clamping connection of the abutting portions and the abutted portions, and drive the axis of the CD stopper to rotate via the abutting connection of the clamping portions and the clamped portions, so that front ends of the abutting portions can rotate towards the outside from the periphery of the minor-diameter CD.

The CD player provided by the second invention is, on the basis of the first invention, as follows: projections are formed on the axis of the CD stopper; the moving member includes a first rotating arm and a sliding plate; the first rotating arm rotates after receiving the rotation of the CD sensor; the clamping portion is disposed on the first rotating arm; the sliding plate is parallel to the axis of the CD stopper and can be driven by the first rotating arm to move along the axial direction of the axis; first inclined cams configured to be clamped with the projections and two stopping portions configured to be clamped with the abutting portions are disposed on the sliding plate; the two stopping portions are respectively taken as the abutted portions (9d) and (9e); after the sliding plate moves towards one side, the abutting portions are clamped with the stopping portions to prevent the axis from rotating, so that the abutting portions can stop at the positions at which the abutting portions abut against the minor-diameter CD; and after the sliding plate moves towards the other side, the first inclined cams are clamped at the projections, so that the front ends of the abutting portions can rotate towards the outside from the periphery of the minor-diameter CD.

The CD player provided by the third invention is, on the basis of the first invention, as follows: the moving member is a rotating arm which is provided with an opening portion (or an open trench) taken as the abutted portion and a projecting portion taken as the clamping portion; and the opening portion is clamped with the abutting portion on one side before the rotation of the rotating arm, so as to prevent the axis from rotating.

In the first invention, the clamping portions and the abutted portions clamped with the abutting portions are disposed on the moving members. The front ends of the abutting portions can rotate towards the outside from the periphery of the minor-diameter CD just by adoption of the structure of arranging the clamped portions on the cam members or an actuating member coupled with the cam members at mobile terminals of the cam members, and hence the abutting connection between the minor-diameter CD and the abutting portions can be avoided when the playback substrates move in the frame due to external vibration.

In the second invention, the moving member consists of a first rotating arm and a sliding plate, and the stopping portions respectively clamped with the two abutting portions are disposed on the sliding plate. Moreover, as the sliding plate moves towards one side to enable the two abutting portions to be clamped with the stopping portions, the axis is prevented from rotating. By adoption of the structure, the two abutting portions are prevented from rotating by the two stopping portions, and thus the minor-diameter CD can stop completely even if the minor-diameter CD abuts against the abutting portions.

In the third invention, the moving member adopts the rotating arm provided with the abutted portion (opening portion) and the clamping portion (projecting portion). The abutted portion is clamped with the abutting portion on one side before the rotation of the rotating arm, so as to prevent the axis from rotating. By adoption of the structure, the stopper release mechanism is further simplified.

DETAILED DESCRIPTION OF THE PREFERRED EMBODIMENTS

The CD player provided by the invention comprises playback substrates, a conveying roller, CD sensors, a CD stopper, a first trigger member, frame members, cam members and moving members, wherein the playback substrates are freely movably supported in a frame; the conveying roller is configured to convey a CD from an insert of the frame to the playback substrate; the CD sensors are driven to rotate by the CD inserted into the insert; the CD stopper is provided with a major axis and abutting portions which are disposed at both ends of the axis and configured to abut against a minor-diameter CD conveyed by the conveying roller, is perpendicular to a centerline of a CD conveying path, and can rotate around the axis; the first trigger member rotates when the minor-diameter CD stops at a mountable position on a turntable via the CD stopper; the frame members are driven to move after receiving the movement of the first trigger member and the power of a motor; the cam members are coupled with the frame members to enable a chuck to be far away from the turntable; and the moving members receive the rotation of the CD sensor and move along the outside diameter of the CD. Moreover, the moving members are provided with clamping portions and abutted portions configured to be clamped with the abutting portions; and clamped portions configured to abut against the clamping portions are disposed on the cam members or an actuating member coupled with the cam members at mobile terminals of the cam members.

Further description will be given below to the invention with reference to the accompanying drawings and the embodiments.

Embodiment 1

Figure 1:
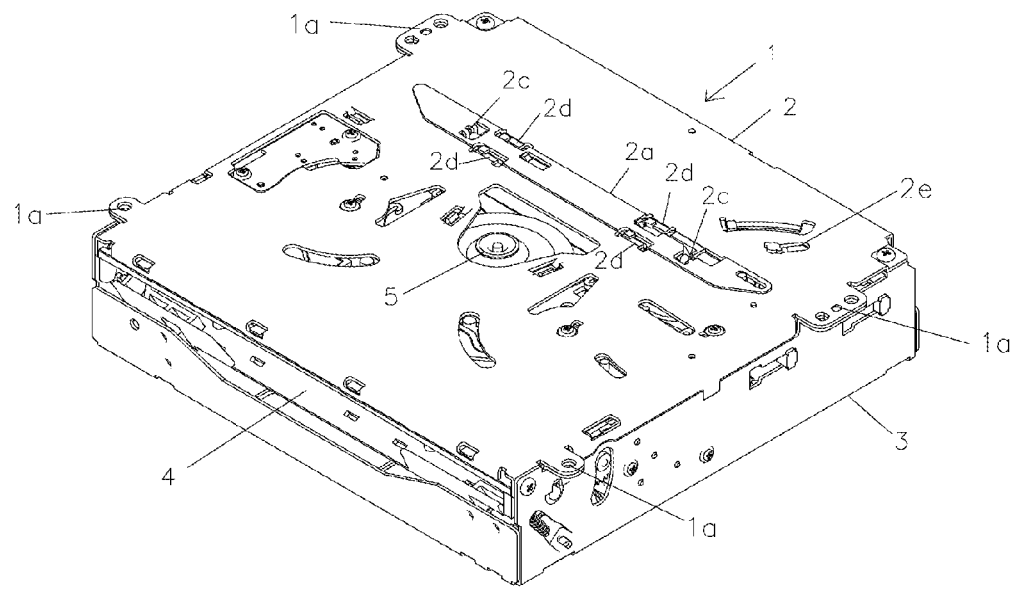
FIG. 1 is a perspective outside view of a CD player provided by an embodiment 1 of the invention.

FIG. 1 is a perspective outside view of a CD player provided by the embodiment 1. As illustrated in FIG. 1, a frame 1 consists of an upper substrate 2 and a lower substrate 3 which are made of metals; a lug provided with a device mounting hole 1a is respectively formed on the upper substrate 2 and the lower substrate, on the outside of the frame, and the lugs are overlapped to guarantee that the substrates may also have sufficient strength even if the substrates have low thickness; and an insert 4 into which a CD is inserted is formed on a side face of the lower substrate 3. Moreover, a playback substrate 7 provided with a turntable 5 and a signal read-write head 6 is arranged inside the frame 1. As seen from the insert 4, slender protrusions 2a are formed on a portion, disposed on the reverse side of the turntable 5, on the upper substrate 2, and a CD stopper 8 configured to enable a minor-diameter CD A to be mounted on the turntable 5 is disposed therein.

Figure 2:
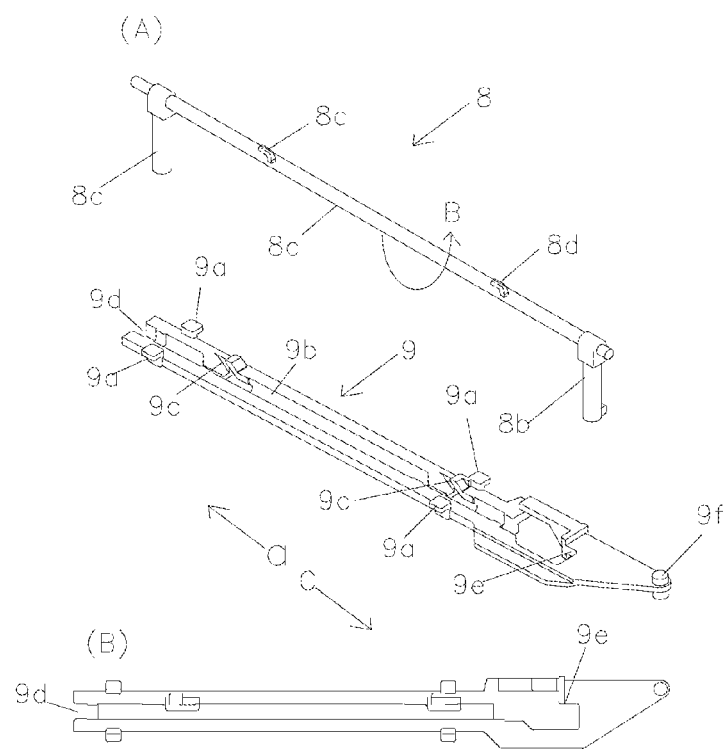
FIG. 2 is perspective views of a CD stopper and a sliding plate of the CD player, and a plan view of the sliding plate.

FIG. 2 illustrates the structures of the CD stopper 8 and a sliding plate 9 (moving member) configured to control the rotation of the CD stopper 8, in which FIG. 2(A) is perspective views of the CD stopper 8 and the sliding plate 9, and FIG. 2(B) is a plan view of the sliding plate 9. As illustrated in FIG. 2(A), the CD stopper 8 includes a major axis 8c and two abutting portions 8a and 8b which are disposed at both ends of the axis 8c and configured to abut against the minor-diameter CD A conveyed by a conveying roller 10; and both ends of the axis 8c are respectively freely rotatably mounted in two axle holes 2c of the upper substrate 2, so that the CD stopper 8 is perpendicular to a centerline of a CD conveying path and can rotate around the axis 8c. Moreover, two projections 8d are formed on the periphery of the axis 8c. On the other aspect, the sliding plate 9 is provided with tongue pieces 9a clamped with guide plates 2d of the upper substrate 2, a U-shaped recess 9b for holding the axis 8c, first inclined cams 9c clamped with the projections 8d, a concave hole stopping portion 9d (abutted portion) configured to be clamped with the abutting portion 8a on one side, a stopping portion 9e (abutted portion) configured to be clamped with the abutting portion 8b on the other side and prevent the axis 8c from rotating, and a small cylinder 9f disposed on an end portion. As illustrated in FIG. 2(B), the concave hole stopping portion 9d is concave on one end portion of the sliding plate 9; and the width of the concave hole stopping portion 9d is slightly more than the plate thickness of the abutting portion 8a, so that the abutting portion 8a can be held into the concave hole stopping portion 9d. After two end portions of the axis 8c of the CD stopper 8 are embedded into the axis hole 2c of the upper substrate 2, for the tongue pieces 9a of the sliding plate 9 to be clamped on the guide plates 2d, the CD stopper 8 and the sliding plate 9 are mounted on the upper substrate 2. Moreover, when the sliding plate 9 moves towards the arrow a direction in the figure, the concave hole stopping portion 9d is engaged with the abutting portion 8a on one side, and the abutting portion 8b on the other side abuts against the stopping portion 9e, so that the rotation of the axis 8c towards the arrow B direction can be prevented. On the other aspect, when the sliding plate 9 moves towards an arrow C direction, the concave hole stopping portion 9d is disengaged from the abutting portion 8a on one side; the abutting connection between the abutting portion 8b on the other side and the stopping portion 9e is released; the first inclined cams 9c are clamped with the projections 8d; and the axis 8c rotates towards the arrow B direction. The rotation towards the arrow B direction is towards front ends of the abutting portions 8a and 8b, in a direction opposite to the insert 4.

Figure 3:
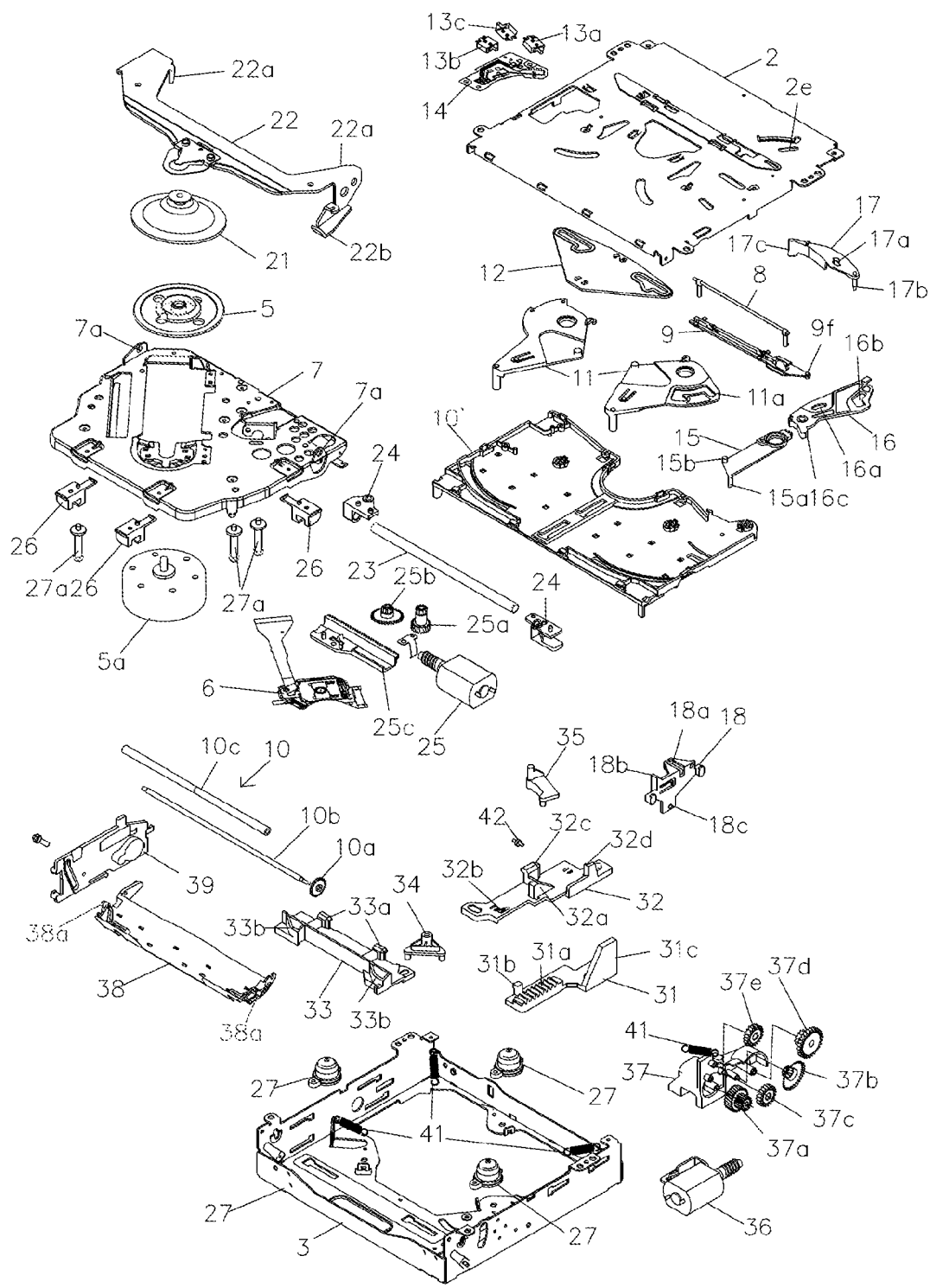
FIG. 3 is a perspective exploded view of the CD player provided by the embodiment 1 of the invention.

FIG. 3 is a perspective exploded view of the CD player provided by the embodiment 1. As illustrated in FIG. 3, apart from the CD stopper 8 and the sliding plate 9, the upper substrate 2 is also provided with a resin substrate 10', a pair of test rods 11 (CD sensors) driven to rotate by the CD inserted into the insert 4, a coupling plate 12 configured to couple a pair of the test rods 11, a printed substrate 14 having two switches 13a and 13b clamped with one test rod 11 to operate and a third switch 13c configured to stop the conveying of the CD, a CD sensor 15 (CD sensor) driven to rotate by the periphery of a major-diameter CD B when the major-diameter CD B is inserted into the insert 4, a first rotating arm 16 (moving member) rotating after receiving the rotation of the CD sensor 15, and a first trigger 17 (first trigger member) driven to rotate by the front end of the periphery of the CD inserted into the insert 4, by taking a pivot axis 17a as the center. In addition, the first rotating arm 16 is provided with a circular hole 16a engaged with the small cylinder 9c of the sliding plate 9, a slotted hole 16b engaged with the pivot axis 17a of the first trigger 17, and a small wrist 16c (clamping portion) clamped with a second trigger 18. Moreover, a cylinder 17b is formed on one end portion of the first trigger 17, and an abutting piece 17c configured to abut against the periphery of the CD is formed on the other end portion. Furthermore, a guide hole 2e engaged with the pivot axis 17a of the first trigger 17 is also formed on the upper substrate 2. Still furthermore, a sliding piece 15a slideably connected with the periphery of the major-diameter CD B and a stud 15b clamped with a cam hole 11a of the other test rod 11 are disposed on the CD sensor 15.

A turntable 5, a chuck 21 for retaining the CD on the turntable 5, and a chuck supporting plate 22 for freely rotatably supporting the chuck are disposed on the upper side of the playback substrate 7, and a turntable motor 5a, a signal read-write head 6, a guide shaft 23 for movably guiding the signal read-write head, fixtures 24 of the guide shaft 23, a signal read-write head motor 25, locking pieces 26 for preventing the playback substrate 7 from moving, and clamping shafts 27a of oil dampers 27 are disposed on the lower side of the playback substrate 7. The chuck supporting plate 22 is supported by a bearings 7a of the playback substrate 7, and a force is applied by a spring (not shown in the figure) to enable the chuck 21 to be close to the direction of the turntable 5. Moreover, a first gear 25a and a second gear 25b configured to reduce the rotary speed of the signal read-write head motor 2 are disposed, and the rotation of the second gear 25b is transmitted to the signal read-write head 6 via a frame gear 25c. The signal read-write head 6 is guided by the guide shaft 23 to move back and forth. Furthermore, stopping pieces 22a abutting against the periphery of the major-diameter CD B when the center of the major-diameter CD B is conveyed to a position at which the center of the major-diameter CD B slightly exceeds the center of the turntable 5 are disposed on the chuck supporting plate 22.

The second trigger 18 (actuating member) provided with an engaged hole 18a engaged with the cylinder 17b of the first trigger 17 is mounted on one side face of the lower substrate 3. An upright leg portion 18c and a pressing piece 18b (abutted portion) capable of being clamped with the small wrist 16c of the first rotating arm 16 are formed on the second trigger 18. In addition, a frame plate 31 (frame member) which moves by enabling an edge 31c to be clamped with the upright leg portion 18c of the second trigger 18, a cam plate 32 (cam member) of which a corner hole 32b is engaged with a corner post 31b of the frame plate 31, a first link 34 configured to transmit the motion of the cam plate 32 to an actuating plate 33, a second link 35 driven to rotate after receiving the motion of the cam plate 32, a main motor 36, a gearbox 37 and the oil dampers 27 are disposed on the lower substrate 3. Moreover, an upright plate 32d configured to abut against the upright leg portion 18c of the second trigger 18 at a mobile terminal and enable the second trigger 18 to move is disposed on the cam plate 32. On the other aspect, a roller supporting plate 38 clamped with the actuating plate 33 to support the conveying roller 10 for conveying the CD is respectively disposed on two side faces of the lower substrate 3. The conveying roller 10 is biconical, that is, the diameter of a central portion is small and the diameter of two end portions is large. Furthermore, a projected surface close to the periphery of the conveying roller 10 is disposed opposite to the roller supporting plate 38 and the conveying roller 10. Due to the arrangement of the projected surface, the gap between the roller supporting plate 38 and the conveying roller 10 is smaller, so that the case that the CD is wrongly inserted into the gap can be avoided. In addition, a locking plate 39 driven to move by the motion of the roller supporting plate 38 is disposed on the other side face of the lower substrate 3. Moreover, three coil springs 41 for suspending the playback substrate 7 are disposed on the lower substrate 3 in the frame 1.

The gearbox 37 is provided with a third gear 37a configured to reduce the speed of the rotation from the main motor 36 and transmit the rotation, a fifth gear 37c configured to transmit the rotation of the third gear 37a to a fourth gear 37b, a sixth gear 37d configured to reduce the speed of the rotation of the fourth gear 37b and transmit the rotation, and a seventh gear 37e configured to transmit the rotation of the fifth gear 37c to a roller gear 10a of the conveying roller 10 for conveying the CD. In addition, a coil spring 41 configured to suspend the playback substrate 7 in the frame 1 is disposed on the gearbox 37. Moreover, a rack 31a engaged with the sixth gear 37d is formed on the frame plate 31. Once the frame plate 31 is driven to move by the second trigger 18, the rack 31a of the frame plate 31 will be engaged with the sixth gear 37d and move with great force. On the other aspect, a second inclined cam 32a clamped with a leg portion 22b of the chuck supporting plate 22 and configured to enable the chuck 21 to move away from the turntable 5 is formed on the cam plate 32, and a rotor 42 is disposed on a vertex of the second inclined cam 32a. Furthermore, a first corner 32c capable of being clamped with the locking pieces 26 of the playback substrate 7 is formed on the cam plate 32. When the first corner 32c is clamped with the locking pieces 26, the movement of the playback substrate 7 can be prevented.

Before the cam plate 32 is driven to move by the frame plate 31, the second link 35 is driven to rotate by the cam plate 32, so that one end of the second link 35 can abut against the playback substrate 7, and hence the movement of the playback substrate 7 can be prevented. Moreover, two second corners 33a clamped with the locking pieces 26 and cam portions 33b clamped with the roller supporting plate 38 are formed on the actuating plate 33. The second corners 33a may be clamped with the locking pieces 26 of the playback substrate 7. When the second corners 33a are clamped with the locking pieces 26, the movement of the playback substrate 7 can be prevented. On the other aspect, minor axes on two end portions of the roller supporting plate 38 are supported on a side face of the lower substrate 3, and a force for pushing the conveying roller 10 is applied by a spring (not shown in the figure), under the resin substrate 10'. The conveying roller 10 includes a rotation axis 10b made of metals, a roller gear 10a disposed at one end of the axis 10b, and a biconical rubber roller 10c which is sleeved on the outside of the axis 10b and of which the diameter of a central portion is less than that of two end portions. Moreover, the locking plate 39 receives the movement of the actuating plate 33. When the locking plate 39 moves towards the direction of the insert 4, not only the third switch 13c is driven to operate but also the clamping connection between the third switch 13c and the playback substrate 7 can be released.

The operation is illustrated below with reference to the FIGS. 4 to 6.

Figure 4:
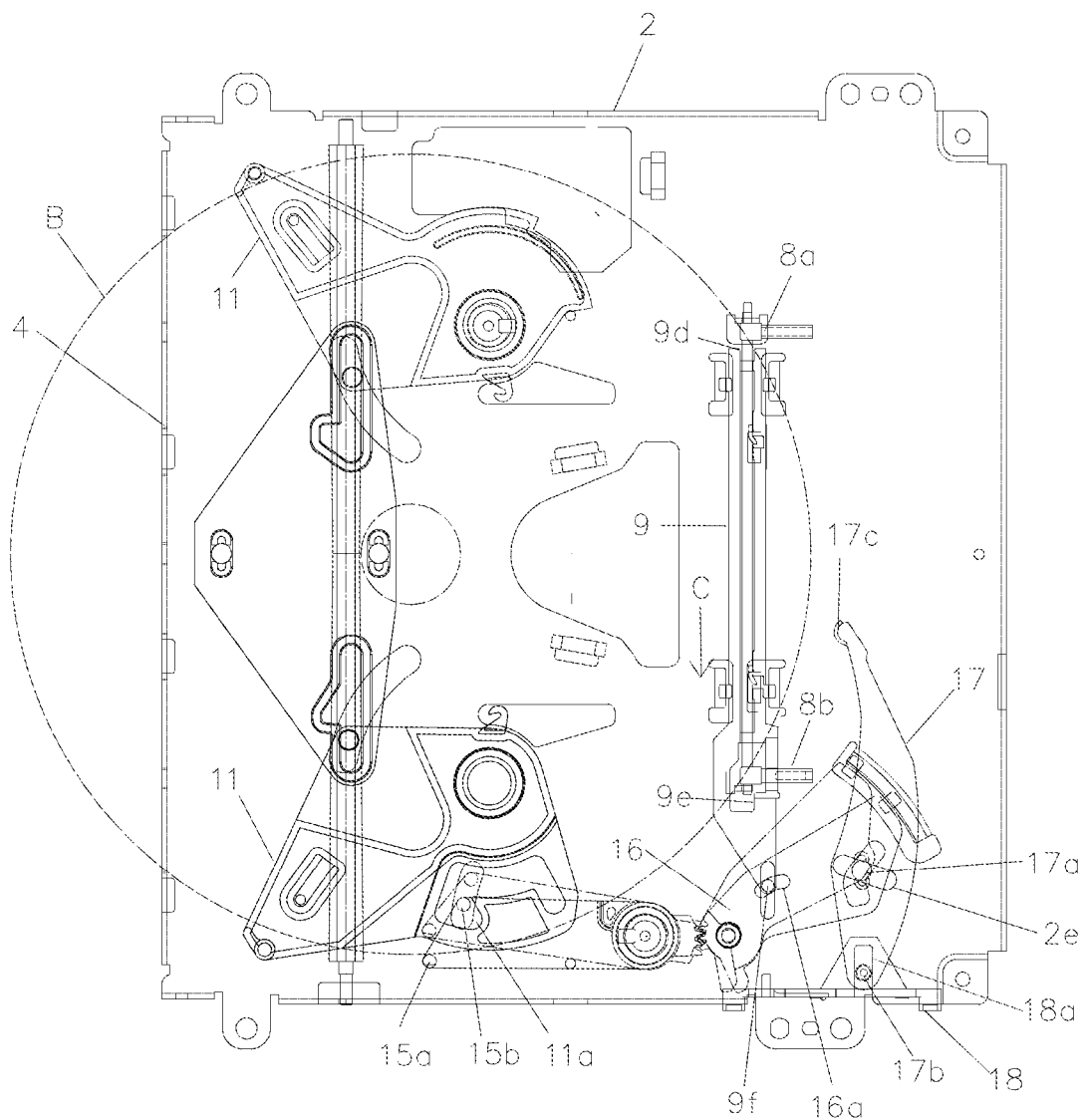
FIG. 4 is a state diagram of the CD player in the process of conveying a major-diameter CD.

FIG. 4 illustrates the state when the major-diameter CD B is inserted into the insert 4 and conveyed. The test rod is driven by the major-diameter CD B to rotate significantly and the main motor is started via the first switch 13a, and hence the periphery of the major-diameter CD B is clamped with the sliding piece 15a so that the CD sensor 15 can rotate from a position represented by the dotted line to a position represented by the solid line. Herein, the stud 15b is clamped with the cam hole 11a so that the CD sensor 15 can stop at a position at which the test rod 11 is driven to rotate. Moreover, along with the rotation of the CD sensor 15, the first rotating arm 16 also rotates from the position represented by the dotted line to the position represented by the solid line. Due to the rotation of the first rotating arm 16, the circular hole 16a drives the sliding plate 9 to move towards the arrow C direction via the small cylinder 9f. When the sliding plate 9 moves towards the arrow C direction, the concave hole stopping portion 9d is disengaged from the abutting portion on one side; the abutting connection between the abutting portion 8b and the stopping portion 9e is released; the first inclined cams 9c are clamped with the projections 8d; and the axis 8c rotates towards the arrow B direction (FIG. 2). Furthermore, as the axis 8c rotates towards the arrow B direction, the front ends of the abutting portions 8a and 8b rotate towards the direction opposite to the insert 4. Therefore, the abutting connection between the abutting portions 8a and 8b and the major-diameter CD B can be avoided.

Moreover, due to the rotation of the first rotating arm 16, the pivot axis 17a of the first trigger 17 moves to the position represented by the solid line along the guide hole 2e of the upper substrate 2. On one aspect, the cylinder 17b of the first trigger 17 is engaged with the engaged hole 18a of the second trigger 18 to control the operation. For this reason, the first trigger 17 rotates clockwise by taking the cylinder 17b as the center, so that the abutting piece 17c can move towards the direction opposite to the insert 4. The result is that the time of the abutting connection between the abutting piece 17c and the major-diameter CD B can be delayed. Moreover, the abutting piece 17c of the first trigger 17 can abut against the major-diameter CD B before the periphery of the major-diameter CD B stops abutting against the stopping pieces 22a of the chuck supporting plate 22 and is conveyed. As described above, when the major-diameter CD B is conveyed, as the axis 8c rotates towards the arrow B direction, the front end of the abutting portion 8a moves towards the direction opposite to the insert 4, so that the abutting connection between the abutting portions 8a and 8b and the major-diameter CD B can be avoided.

Figure 5:
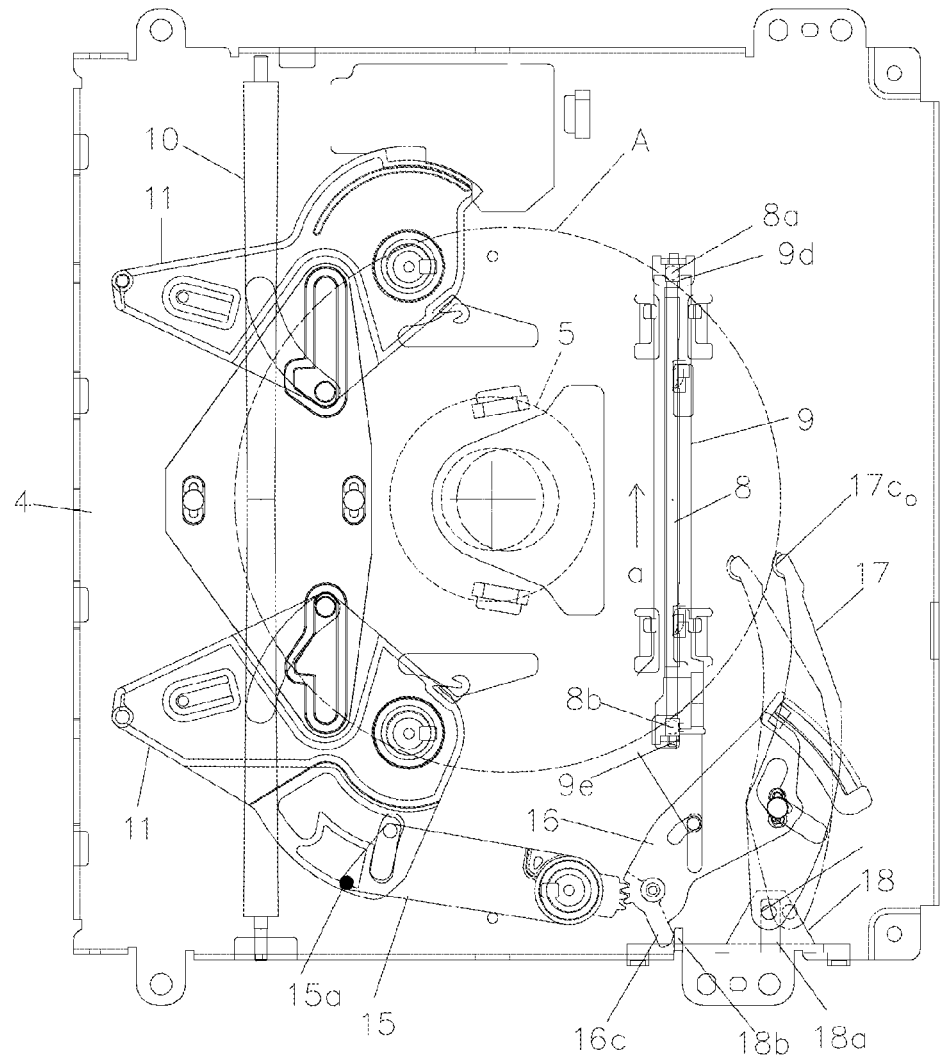
FIG. 5 is a state diagram of the CD player in the process of conveying a minor-diameter CD.
Figure 5:
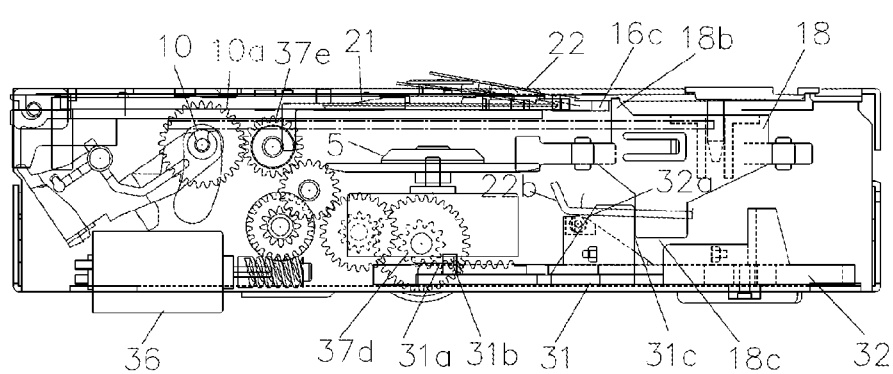

FIG. 5 illustrates the state when the center of the minor-diameter CD A is conveyed by the conveying roller 10 to a position at which the minor-diameter CD A slightly exceeds the center of the turntable 5, in which FIG. 5(B) is a side view of FIG. 5(A). When the minor-diameter CD A is inserted into the insert 4, the first switch 13a is switched on via the test rod, and hence the main motor 36 is started. However, as the outside diameter of the minor-diameter CD A is small, the minor-diameter CD A cannot be clamped on the sliding piece 15a of the CD sensor 15 in the process of being conveyed by the conveying roller 10, and the CD sensor 15 and the first rotating arm 16 cannot rotate. Therefore, the sliding plate 9 can stop at a position from which the sliding plate 9 moves towards the arrow a direction. When the sliding plate 9 moves towards the arrow a direction, the concave hole stopping portion 9d is engaged with the abutting portion 8a on one side and the abutting portion 8b on the other side abuts against the stopping portion 9e, so that the rotation of the axis 8c towards the arrow B direction can be prevented. Therefore, the abutting portions 8a and 8b can abut against the periphery of the minor-diameter CD A. As the abutting force comes from the friction force of the conveying roller 10 and the minor-diameter CD A, a large force can be formed. As the concave hole stopping portion 9d is engaged with the abutting portion 8a on one side and the abutting portion 8b on the other side abuts against the stopping portion 9e, the CD stopper 8 of the embodiment adopts the two abutting portions 8a and 8b to bear the force. Therefore, the stop of the conveying of the minor-diameter CD A can be guaranteed. Moreover, when the center of the minor-diameter CD A is conveyed by the conveying roller 10 to the position at which the minor-diameter CD A slightly exceeds the center of the turntable 5, the abutting piece 17c of the first trigger 17 is driven by the periphery of the minor-diameter CD A to rotate from the position represented by the dotted line to the position represented by the solid line, by taking the pivot axis 17a as the center. Due to the rotation of the first trigger 17, the second trigger 18 moves towards the left. However, in the moving process, the pressing piece 18b does not abut against the small wrist 16c.

As illustrated in FIG. 5(B), the second trigger 18 receives the rotation of the first trigger 17 and moves towards the left in the figure; and the upright leg portion 18c of the second trigger 18 abuts against the edge 31c of the frame plate 31 so that the frame plate 31 can move towards the left. Due to the movement of the frame plate 31, the rack 31a is engaged with the sixth gear 37d and moves with great force. The corner post 31b projected on the frame plate 31 drives the cam plate 32 and the frame plate 31 to move towards the left together via the corner hole 32b of the cam plate 32. As the second inclined cam 32a clamped with the leg portion 22b of the chuck supporting plate 22 is formed on the cam plate 32, the second inclined cam 32a is disengaged from the leg portion 22b due to the movement towards the left. Moreover, in FIG. 5(B), as the leg portion 22b is clamped at a vertex of the second inclined cam 32a, the chuck 21 and the turntable 5 are separate from each other, and hence the CD can travel through the chuck 21 and the turntable 5. On the other aspect, the roller gear 10a is engaged with the seventh gear 37e, and the rotation from the main motor 36 is transmitted to the conveying roller 10.

Figure 6:
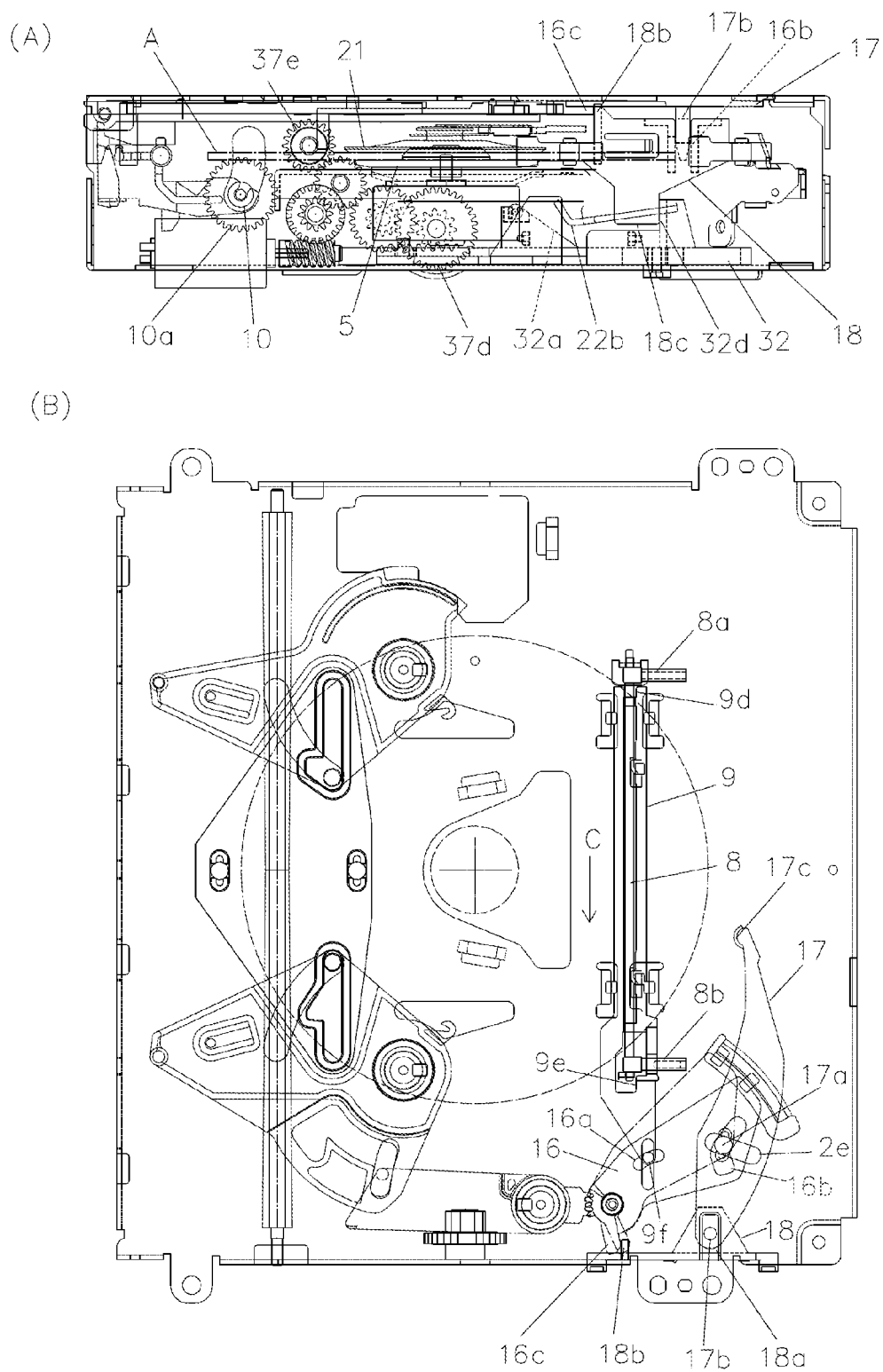
FIG. 6 is a state diagram of the CD player when the conveying of the minor-diameter CD is ended.

FIG. 6 illustrates the state when the minor-diameter CD A is retained on the turntable 5 by the chuck 21, in which FIG. 6(A) is a side view and FIG. 6(B) is a front view. As illustrated in FIG. 6(A), at this point, the cam plate 32 is disposed at the position of a left mobile terminal, and the second inclined cam 32a is disengaged from the leg portion 22b. Moreover, the upright plate 32d of the cam plate 32 abuts against the upright leg portion 18c of the second trigger 18 so that the second trigger 18 can move towards the left.

As illustrated in FIG. 6(B), due to the left movement caused by the cam plate 32, the pressing piece 18b of the second trigger 18 actuates the small wrist 16c of the first rotating arm 16 so that the first rotating arm 16 can rotate from a position represented by the dotted line to a position represented by the solid line. Due to the rotation of the first rotating arm 16, the circular hole 16a drives the sliding plate 9 to move towards the arrow C direction via the small cylinder 9f. When the sliding plate 9 moves towards the arrow C direction, the concave hole stopping portion 9d is disengaged from the abutting portion 8a on one side; the abutting connection between the abutting portion 8b on the other side and the stopping portion 9e is released; the first inclined cams 9c are clamped with the projections 8d; and the axis 8c rotates towards the arrow B direction. Moreover, as the axis 8c moves towards the arrow B direction, the front ends of the abutting portions 8a and 8b rotate towards the direction opposite to the insert 4, and hence the abutting portions 8a and 8b are disengaged from the periphery of the minor-diameter CD A, and consequently the abutting connection between the abutting portions 8a and 8b and the minor-diameter CD A can be released. Moreover, due to the rotation of the first rotating arm 16, the slotted hole 16b drives the pivot axis 17a of the first trigger 17 to move along the guide hole 2e, and hence the first trigger 17 rotates clockwise by taking the cylinder 17b as the center and the abutting piece 17c is disengaged from the periphery of the minor-diameter CD A.

On the other aspect, when the cam plate 32 moves towards the left, the second link 35 is away from the playback substrate 7, and the first corner 32c is away from the locking pieces 26 as well. In addition, along with the left movement of the cam plate 32, the actuating plate 33 moving via the first link 34 drives the roller supporting plate 38 to rotate so that the conveying roller 10 is away from the CD, when the second corners 33a are away from the locking pieces 26. Moreover, the roller supporting plate 38 drives the locking plate 39 to move towards the direction of the insert 4 in the process of driving the conveying roller 10 to be away from the CD. Due to a series of actions, the playback substrate 7 is supported by the coil spring 41 and the oil dampers 27 and moves freely in the frame 1.

As described above, in the embodiment 1, the sliding plate 9 and the first rotating arm 16 are taken as the moving members; the abutted portions (a concave hole 9b, the stopping portion 9e) are disposed on the sliding plate 9; and the clamping portion (the small wrist 16c) is disposed on the first rotating arm 16. Just by adoption of the simple structure of arranging the clamped portion (the pressing piece 18b) on the second trigger 18, even if the playback substrate 8 moves in the frame 1 due to the external vibration, as the front ends of the abutting portions 8a and 8b rotate towards the outside from the periphery of the minor-diameter CD, the abutting connection between the minor-diameter CD A and the abutting portions 8a and 8b can be avoided. Moreover, the abutting portion 8a on one side and the abutting portion 8b on the other side respectively adopt the concave hole stopping portion 9d and the stopping portion 9e to prevent the axis 8c from rotating. Therefore, even if the minor-diameter CD A abuts against the abutting portion 8a, the two abutting portions 8a and 8b may also make sure that the minor-diameter CD A stops conveying.

Embodiment 2

Figure 7:
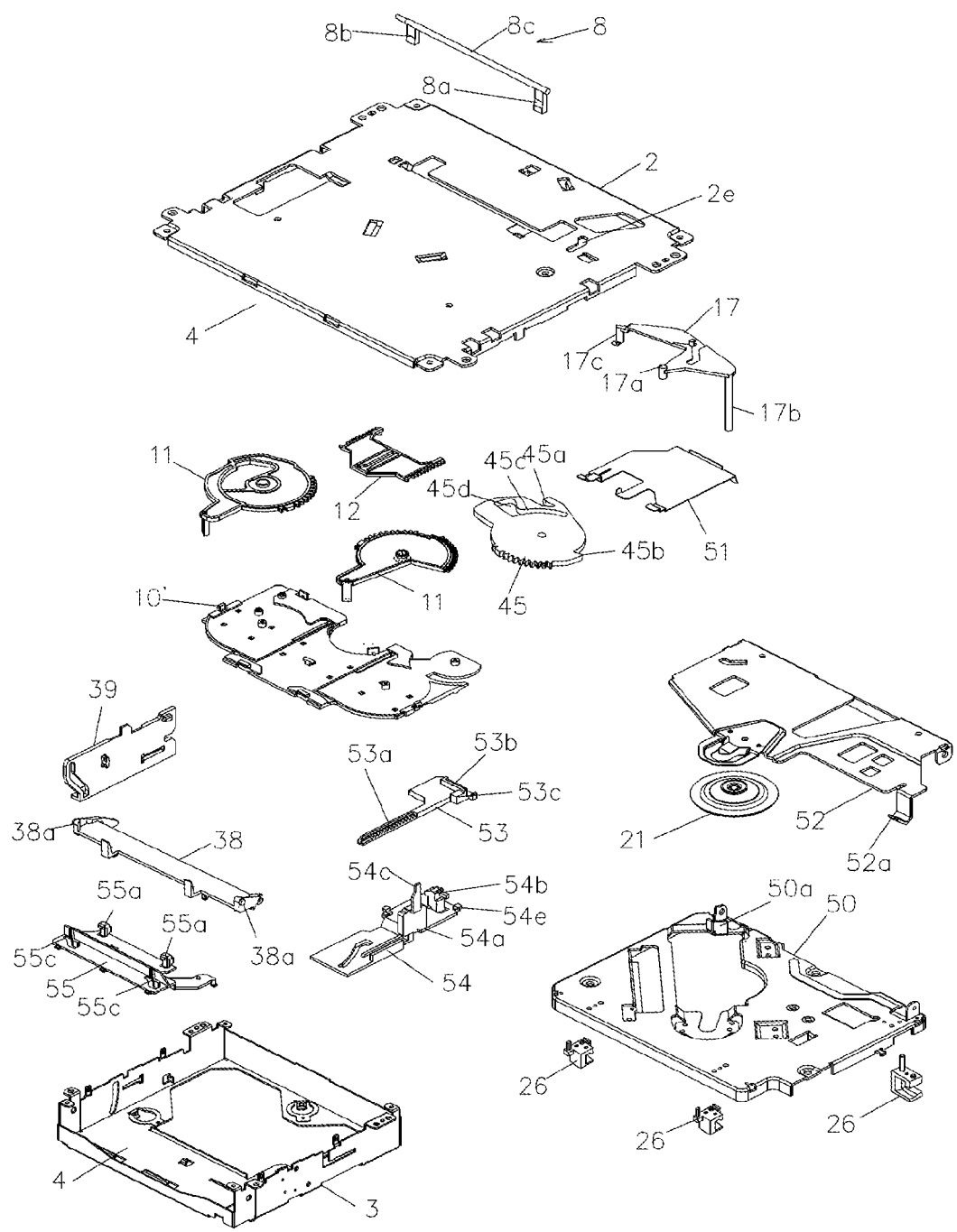
FIG. 7 is a perspective exploded view of a CD player provided by an embodiment 2 of the invention.

FIG. 7 is an exploded view of the CD player provided by the embodiment 2. Components with the same functions in the embodiment 1 use the same names and numerals. A CD stopper 8, a resin substrate 10', a pair of test rods 11 (CD sensor), a coupling plate 12, a rotating arm 45 (moving member) and a first trigger 17 (first trigger member) are disposed on the upper substrate 2, wherein the CD stopper 8 has a major axis 8c and two abutting portions 8a and 8b which are disposed at both ends of a axis 8c and configured to abut against a minor-diameter CD A, is supported on the upper substrate 2 via both ends of the axis 8c, is perpendicular to a centerline of a CD conveying path, and can rotate around the axis 8c; the resin substrate 10' is configured to guide a CD; a pair of the test rods 11 are driven to rotate by the CD inserted into an insert 4; the coupling plate 12 drives a pair of the test rods 11 to be coupled to each other; the rotating arm 45 is engaged with the test rod 11 on one side and rotates; and the first trigger 17 is driven by the peripheral front end of the CD inserted into the insert 4 to rotate by taking a pivot axis 17a as the center. In addition, a sheet 51 configured to drive the first trigger 17 to be freely movably retained on the upper substrate 2 is disposed under the upper substrate 2. An open trench 45a (abutted portion) and a projecting portion 45b (clamping portion) are disposed on the rotating arm, wherein the open trench 45a is clamped with one abutting portion 8a of the CD stopper 8 so that the abutting portions 8a and 8b can stop at positions at which the abutting portions 8a and 8b abut against the minor-diameter CD A; and the projecting portion 45b is clamped with an upright post 54c (clamped portion) of a cam plate 54 (cam member). When the rotating arm 45 rotates, an edge of the open trench 45a is raised to raise the abutting portion 8a, so that the front end of the abutting portion 8a can rotate towards the direction opposite to the insert 4. Moreover, the edge of the open trench 45a may stop at a position at which the abutting portion 8a is driven to rotate. Furthermore, a cylinder 17b is formed on one end portion of the first trigger 17; an abutting piece 17c abutting against the periphery of the CD is formed on the other end portion; and the pivot axis 17a is formed in a central portion. The pivot axis 17a is engaged with a circular hole 45c of the rotating arm 45 and a guide hole 2e of the upper substrate 2. Moreover, a recess 45d which drives the pivot axis 17a to move towards one end of the guide hole 2e at a rotating terminal of the rotating arm 45 is formed on the circular hole 45c.

A turntable 5, a chuck 21 for retaining the CD on the turntable 5, and a chuck supporting plate 52 for freely rotatably supporting the chuck 21 are disposed on the upper portion of the playback substrate 50, and locking pieces 26 for preventing the playback substrate 50 from moving are disposed on the lower portion of the playback substrate 50. In addition, a stopping piece 50a configured to abut against the periphery of a major-diameter CD B when the center of the major-diameter CD B is conveyed to a position at which the center of the major-diameter CD B slightly exceeds the center of the turntable is disposed on the playback substrate 50. Moreover, although not illustrated, the following components the same with those of the embodiment 1 are also disposed on the playback substrate 50: a main motor 36, a signal read-write head 6, a guide shaft 23 for movably guiding the signal read-write head, fixtures 24 of the guide shaft 23, a signal read-write head motor 25 and clamping shafts 27a of oil dampers 27.

On one aspect, a frame plate 53 (frame member) is disposed on one side face of the lower substrate 3; and an abutting piece 53b configured to abut against the cylinder 17b of the first trigger 17 and a projecting piece 53c configured to abut against a first wall 54a of the cam plate 54 are disposed on the frame plate 53. In addition, as the abutting piece 53c of the frame plate 53 abuts against the first wall 54a of the cam plate 54, the cam plate 54 and the frame plate 53 move towards the left together. Moreover, an actuating plate 55 which moves after receiving the motion of the cam plate 54 is arranged. Furthermore, the cam plate 54 is provided with a second wall 54e which abuts against the cylinder 17b at a left mobile terminal and drives the first trigger 17 to rotate. On the other aspect, a roller supporting plate 38 which is clamped with the actuating plate 55 to support the conveying roller 10 for conveying the CD is respectively disposed on two side faces of the lower substrate 3. In addition, a locking plate 39 which moves due to the motion of the roller supporting plate 38 is disposed on the other side face of the lower substrate 3. Moreover, although not illustrated, the oil dampers 27 and a coil spring 41 the same with those of the embodiment 1 are also arranged.

As illustrated in FIG. 8(B), a gearbox is provided with an eighth gear 56 configured to reduce the speed of the rotation of the main motor 36 and transmit the rotation, a ninth gear 57 engaged with the eighth gear 56, a tenth gear 58 configured to reduce the speed of the rotation of the ninth gear 57 and transmit the rotation, and an eleventh gear 59 configured to transmit the rotation of the eighth gear 56 to a roller gear 10a of the conveying roller 10 for conveying the CD. In addition, a rack 53a engaged with the tenth gear 58 is formed on the frame plate 53. When the frame plate 53 is driven by the first trigger 17 to move towards the left, the rack 53a is engaged with the tenth gear 58. Due to the great force, the frame plate 53 moves towards the left. Moreover, a third inclined cam 54f which is clamped with a leg portion 52a of the chuck supporting plate 52 to drive the chuck 21 to be away from the turntable 5, and a first corner 54b which can be clamped with the locking pieces 26 of the playback substrate 50 are disposed on the cam plate 54. Once the first corner 54b is clamped with the locking pieces 26, the movement of the playback substrate 50 can be prevented.

Two second corners 55a clamped with the locking pieces 26 and cam portions 55c clamped with the roller supporting plate 38 are formed on the actuating plate 55. The second corners 55a may be clamped with the locking pieces 26 of the playback substrate 50. When the second corners 55a are clamped with the locking pieces 26, the movement of the playback substrate 50 can be prevented. On one aspect, minor axes 38a on two end portions of the roller supporting plate 38 are supported on a side face of the lower substrate 3, and a force for driving the conveying roller 10 is applied by a spring (not shown in the figure), under the resin substrate 10'. The structure of the conveying roller 10 is the same with that of the embodiment 1. Moreover, when the locking plate 39 receives the movement of the actuating plate 55 and moves towards the direction of the insert 4, the clamping connection between the locking plate 39 and the playback substrate 50 can be released.

Figure 8:
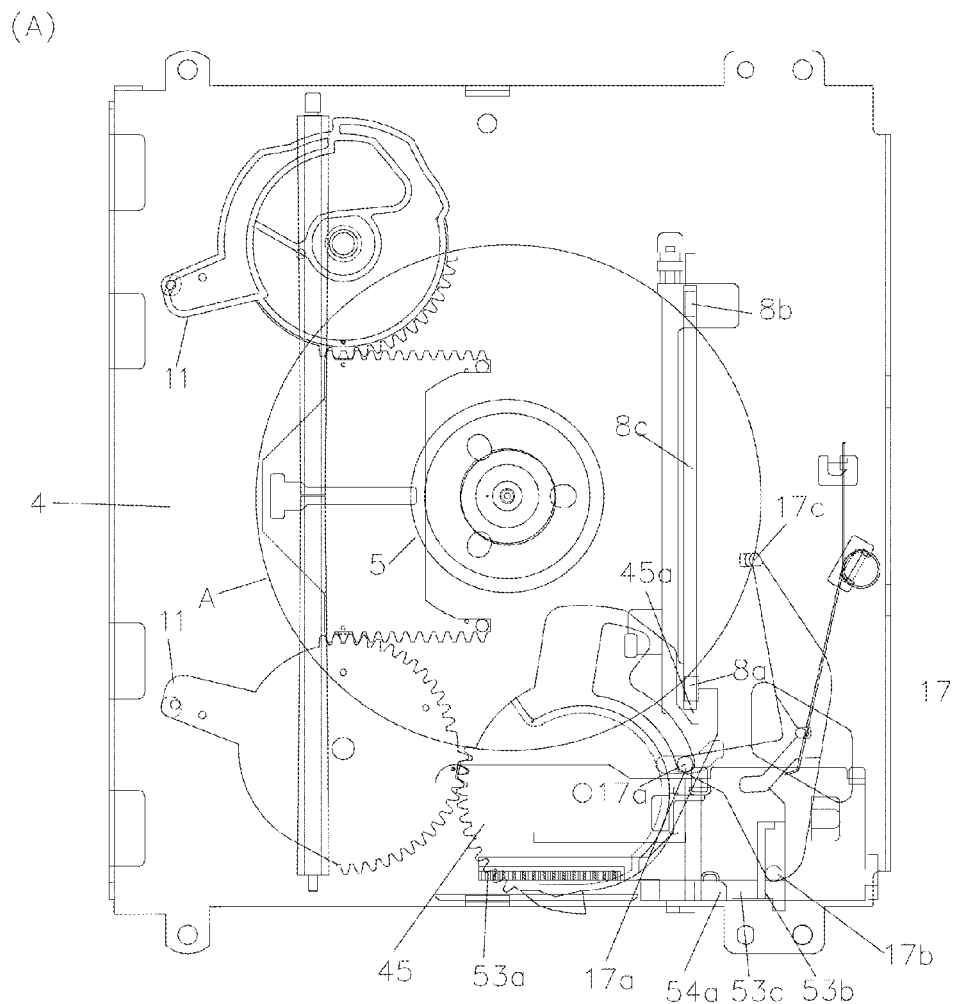
FIG. 8 is a state diagram of the CD player provided by the embodiment 2 in the process of conveying a minor-diameter CD.
Figure 8:
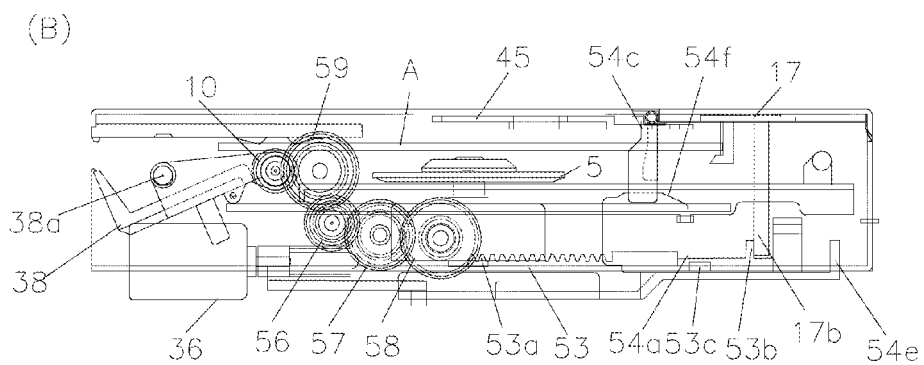

FIG. 8 illustrates the sate when the minor-diameter CD A is conveyed by the conveying roller 10 to a position at which the center of the conveying roller 10 slightly exceeds the center of the turntable 5, in which FIG. 8(B) is a side view of FIG. 8(A). When the minor-diameter CD A is inserted into the insert 4, the test rod 11 is driven to rotate, and hence the main motor is driven to start. In addition, the test rod 11 rotates and returns to an initial position when the center of the minor-diameter CD A arrives at the center of the turntable 5. As the test rod 11 is returned to the initial position, the rotating arm 45 rotates and returns as well, and the open trench 45a is clamped with the abutting portion 8a so that the abutting portions 8a and 8b can stop at the position at which the abutting portions 8a and 8b abut against the minor-diameter CD A. Moreover, when the center of the minor-diameter CD A is conveyed by the conveying roller 10 to the position at which the center of the conveying roller 10 slightly exceeds the center of the turntable 5, the minor-diameter CD A abuts against the abutting portions 8a and 8b, and the conveying process is ended. At this point, the abutting piece 17c of the first trigger 17 is driven to rotate by the periphery of the minor-diameter CD A, by taking the pivot axis 17a as the center. Due to the rotation of the first trigger 17, the cylinder 17b presses the abutting piece 53b so that the frame plate 53 can move towards the left.

As illustrated in FIG. 8(B), the frame plate 53 receives the rotation of the first trigger 17 and moves towards the left in the figure. Due to the movement of the frame plate 53, the rack 53a is engaged with the tenth gear 58 and moves with great force. The projecting piece 53c of the frame plate 53 abuts against the first wall 54a of the cam plate 54, so that the cam plate 54 and the frame plate 53 can move towards the left together. Moreover, in FIG. 8(B), the leg portion 52a of the chuck supporting plate 52 is also clamped with the third inclined cam 54f, and the chuck 21 is away from the turntable 5. The CD can travel through the chuck 21 and the turntable 5. On the other aspect, the roller gear 10a is engaged with the eleventh gear 59 to transmit the rotation from the main motor 36 to the conveying roller 10.

Figure 9:
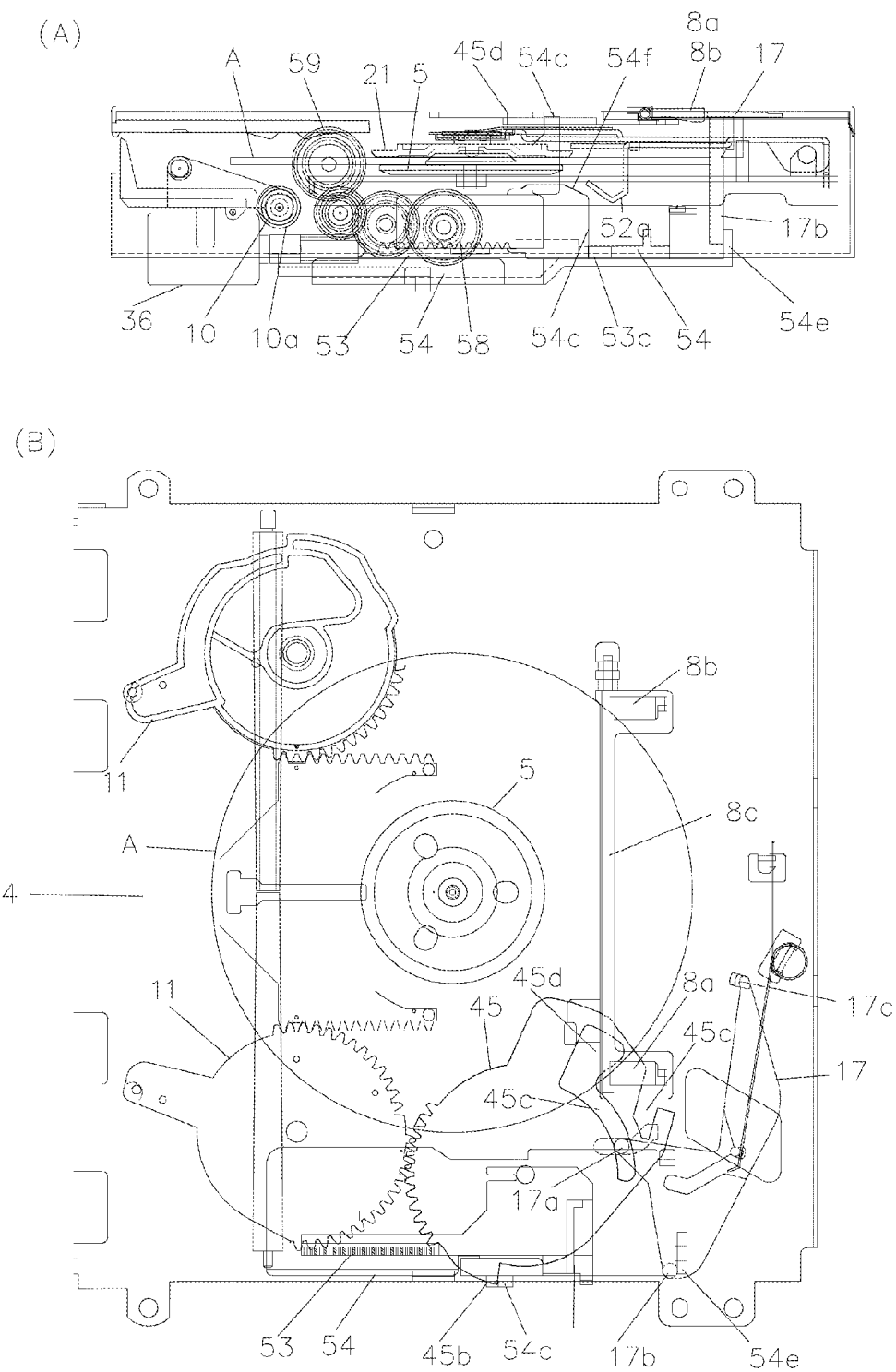
FIG. 9 is a state diagram of the CD player provided by the embodiment 2 when the conveying of the minor-diameter CD is ended.

FIG. 9 illustrates the state when the minor-diameter CD A is retained on the turntable 5 by the chuck 21, in which FIG. 9(A) is a side view of FIG. 9(B). At this point, the cam plate 54 is disposed at the position of the left mobile terminal, and the third inclined cam 54f is disengaged from the leg portion 52a. Moreover, the second wall 54e of the cam plate 54 abuts against the cylinder 17b of the first trigger 17, so that the first trigger 17 can rotate clockwise by taking the pivot axis 17a as the center. As illustrated in FIG. 9(B), as the upright post 54c clamped with the projecting portion 45b is disposed on the cam plate 54, the upright post 54c abuts against the projecting portion 45b of the rotating arm 45, so that the rotating arm 45 can rotate clockwise. Due to the rotation of the rotating arm 45, the edge of the open trench 45a is clamped with the abutting portion 8a, so that the axis 8c can rotate towards the arrow B direction, and hence the abutting portion 8a can be raised. Moreover, as the axis 8c rotates towards the arrow B direction, the front ends of the abutting portions 8a and 8b rotate towards the outside from the periphery of the minor-diameter CD A, so that the abutting portions 8a and 8b are away from the periphery of the minor-diameter CD A, and hence the abutting connection between the abutting portions 8a and 8b and the minor-diameter CD A can be avoided.

On one aspect, along with the left movement of the cam plate, the first corner 54b is disengaged from the locking pieces 26. In addition, along with the left movement of the cam plate 54, the actuating plate 55 drives the roller supporting plate 38 to rotate so that the conveying roller 10 can be away from the CD, when the second corners 55a are disengaged from the locking pieces 26. Moreover, the roller supporting plate 38 drives the locking plate 39 to move towards the direction of the insert 4 in the process of driving the conveying roller 10 to be away from the CD. Due to a series of actions, the playback substrate 50 is supported by the coil spring 41 and the oil dampers 27 and freely moves in the frame 1.

As described above, in the embodiment 2, the rotating arm 45 is taken as the moving member. By adoption of the simple structure of arranging the abutted portion (the open trench 45a) and the clamping portion (the projecting portion 45b) on the rotating arm 45, even if the playback substrate 50 moves in the frame due to external vibration, as the front ends of the abutting portions 8a and 8b rotate towards the outside from the periphery of the minor-diameter CD A, the abutting connection between the minor-diameter CD A and the abutting portions 8a and 8b can be avoided.

Moreover, in the above two embodiments, when the major-diameter CD B is conveyed by the conveying roller 10 from the insert 4, as the major-diameter CD B abuts against the stopping pieces 22a or 50a on the playback substrate 7 or 50, the conveying process is ended. That is to say, as the stopping pieces 22a or 50a configured to stop the conveying process of the major-diameter CD B is disposed on the playback substrate 7 or 50, even if the playback 7 or 50 moves in the frame due to the external vibration, the major-diameter CD B will not abut against the stopping pieces 22a or 50a in the playback process.

The invention not only can be taken as a vehicle CD player but also can be taken as a portable CD player and a domestic CD player.

What is claimed is:

1. A compact disc (CD) player, comprising playback substrates (7) and (50), a conveying roller (10), CD sensors (11) and (15), a CD stopper (8), a first trigger member (17), frame members (31), cam members (32), and moving members (9) and (16), wherein the playback substrates (7) freely movably supported in a frame (1); the conveying roller (10) configured to convey a CD from an insert (4) of the frame to the playback substrate; the CD sensors (11) and (15) driven to rotate by the CD inserted into the insert; the CD stopper (8) provided with a major axis (8c) and abutting portions (8a) and (8b) disposed at both ends of the axis and configured to abut against a minor-diameter CD (A) conveyed by the conveying roller, being perpendicular to a centerline of a CD conveying path, and rotating around the axis; the first trigger member (17) rotating when the minor-diameter CD stopping at a mountable position on a turntable (5) via the CD stopper; the frame members (31) driven to move after receiving the movement of the first trigger member and the power of a motor; the cam members (32) coupled with the frame members to enable a chuck (21) to be far away from the turntable; the moving members (9) and (16) receiving the rotation of the CD sensor and moving along the outside diameter of the CD; and wherein the moving members provided with clamping portions (16c) and abutted portions (9d) and (9e) configured to be clamped with the abutting portions;

clamped portions (18b) configured to abut against the clamping portions disposed on the cam members or an actuating member (18) coupled with the cam members at mobile terminals of the cam members;

and the moving members enabling the abutting portions to stop at positions, at which the abutting portions abut against the minor-diameter CD, via the clamping connection of the abutting portions and the abutted portions, and driving the axis of the CD stopper to rotate via the abutting connection of the clamping portions and the clamped portions, so that front ends of the abutting portions can rotate towards the outside from the periphery of the minor-diameter CD.

2. The CD player according to claim 1, wherein projections (8d) are formed on the axis of the CD stopper; the moving member includes a first rotating arm (16) and a sliding plate (9); the first rotating arm rotates after receiving the rotation of the CD sensor; the clamping portion (16c) is disposed on the first rotating arm; the sliding plate is parallel to the axis of the CD stopper and can be driven by the first rotating arm to move along the axial direction of the axis; first inclined cams (9c) configured to be clamped with the projections (8d) and two stopping portions configured to be clamped with the abutting portions are disposed on the sliding plate; the two stopping portions are respectively taken as the abutted portions (9d) and (9e);

after the sliding plate moves towards one side, the abutting portions are clamped with the stopping portions to prevent the axis from rotating, so that the abutting portions can stop at the positions at which the abutting portions abut against the minor-diameter CD; and after the sliding plate moves towards the other side, the first inclined cams (9c) are clamped at the projections (8d), so that the front ends of the abutting portions can rotate towards the outside from the periphery of the minor-diameter CD.

* * * * *